United States Patent
Margulis

[11] Patent Number: 5,827,347
[45] Date of Patent: Oct. 27, 1998

[54] PROCESS FOR THE RECOVERY OF LEAD FROM SPENT BATTERIES

[75] Inventor: Efim Margulis, Hafia, Israel

[73] Assignee: Margulead Ltd., Haifa, Israel

[21] Appl. No.: 686,623

[22] Filed: Jul. 24, 1996

[30] Foreign Application Priority Data

May 23, 1996 [IL] Israel ......................................... 118397

[51] Int. Cl.$^6$ ..................................................... C25C 3/34

[52] U.S. Cl. ........................... 75/419; 205/369; 423/621; 429/49

[58] Field of Search .............................. 205/369; 75/419; 429/49; 423/621

[56] References Cited

U.S. PATENT DOCUMENTS 4,058,396  11/1977  Birk ........................................ 205/369

*Primary Examiner*—Melvyn Andrews
*Attorney, Agent, or Firm*—Lowe Hauptman Gopstein Gilman & Berner

[57] ABSTRACT

A process for the recovery of lead from spent battery paste and lead containing materials. The process includes the steps of calcination of a spent paste treated with an alkali carbonate or hydroxide or any mixture thereof, and elemental sulphur at a temperature of up to 600° C., followed by washing with water. The calcined and washed paste is dissolved in an alkali molten electrolyte, and lead is electrowinned from the alkali molten electrolyte. The spent electrolyte is reused in the process.

10 Claims, 2 Drawing Sheets

PROCESS FOR THE RECOVERY OF LEAD FROM SPENT BATTERIES

FIELD OF THE INVENTION

The present invention relates to a process for the recovery of metallic lead from exhausted batteries. More particularly, the invention relates to an improved process for the recovery of pure metallic lead from a paste obtained from exhausted lead-acid batteries by electrowinning which also resolves environmental problems and pollution.

BACKGROUND OF THE INVENTION

The recovery of lead from exhausted lead-acid batteries was quite extensively investigated during the last sixty years and carried out in large scale, the goal being to reduce the costs as well as to be more friendly to the environment. The acute problem of pollution, contributed to an increased interest in the last years, looking for improved methods which would provide less pollution and thus could decrease environmental problems compared with the known pyrometallurgical processes.

A first step in most of the known processes is the desulphurization of the paste resulted from the exhausted batteries. This desulphurization is carried out by an aqueous alkali solution comprising sodium carbonate, sodium hydroxide or ammonium hydroxide. The main disadvantages of this operation are as follows:

The operation takes a relatively long time (about one hour) and generally only a desulphurization of about 90% is obtained.

The desulphurization by a relatively expensive alkali hydroxide reagent produces a less expensive alkali sulfate as by-product.

The desulphurization by ammonium hydroxide is only partially, when the dissolution of lead is avoided.

A relatively recent method for the processing of the paste in order to recover the lead is described in a paper (G. Diaz et al. Journal of Metals, January 1996, p. 29–31). The method is based on the leaching of lead from an acidic solution followed by electrowinning of the lead from said solution. A problem encountered in the electrowinning is connected with the problem of the anode passivation by the deposition of lead dioxide increasing of circuit resistance and decreasing the corrosion stability of the respective anode. The usual electrolytes in this process, such as $HBF_4$, HCl, $H_2SiF_6$ are known by their agressive properties and problematic dissolution of lead dioxide and accordingly a high stable graphite anode has to be used. There was also suggested anodes of lead dioxide coated on titanium or tantalum coated on copper. A suggestion for eliminating the polarization of anodic lead dioxide, consists in the addition of a foreign constituent selected from phosphates, arsen and cobalt, connected with the contamination of an electrlyte.

Although the lead electrowinning from aqueous solutions is quite utilized, it has the following main disadvantages:

Requires a high capital cost, in view of its low specific productivity. Thus, in the above quoted recent paper (page 29) it is mentioned a productivity of about 90 kg Pb per sq.m.day. But about 40% of this amount is consumed in the process for reduction of lead dioxide during the leaching of paste.

The stripping of solid lead deposit from cathodes is quite expensive.

A relatively large distance between the electrodes is involved in order to avoid the formation of a sponge mass and as a result only a low specific productivity per volume of the electrolyte will result.

An additional cost will be required for melting the cathodic lead in ingots.

There are some patents (U.S. Pat. Nos. 5,279715, 5,378325 and 4,420,380) which describe the electrowinning of lead from molten electrolyte. However, as pointed out in the above three U.S. patents, this approach is characterized by the following main disadvantages: the high melting point of the electrolyte, the aggressive nature of the molten electrolyte and liberation of toxic gases on anodes.

It is an object of the present invention to provide an improved process for the recovery of lead from a spent paste obtained from exhausted batteries. It is another object of the present invention to provide an improved process for the recovery of metallic lead from a spent paste of exhausted batteries, without producing a solid, liquid or gaseous hazardous wasted materials. It is yet another object of the present invention to provide an improved process for the recovery of metallic lead from a spent paste of exhausted batteries, which is more economical than the known processes.

BRIEF DESCRIPTION OF THE INVENTION

The invention relates to an improved process for the recovery of lead from spent batteries paste and lead containing materials, such as dust, dross, which comprises the steps of:

(a) calcination of a spent paste treated with an alkali carbonate or hydroxide and elemental sulfur at a temperature up to 600° C., followed by washing with water;

(b) dissolution of the resulted calcined and washed paste in an alkali molten electrolyte, and (c) electrowinning of lead from the alkali molten electrolyte, the spent electrolyte being returned to the process.

The last step is carried out at a temperature in the range of between 450° to 600° C., using a current density at cathode in the range of between 1.3 to 5.0 $Ka/m^2$, the amount deposited at the anode being up to six times more than at the cathode. The amount of sulfur is small, generally being in the range of between 0.04 to 0.05 by weight of the ratio $S:PbO_2$.

Among the advantages of carrying out said electrowinning in an alkali medium compared with an acidic medium, it should be mentioned: its more selectivity towards lead; its relatively low melting point and its lower toxicity.

A BRIEF DESCRIPTION OF DRAWINGS

DETAILED DESCRIPTION OF THE INVENTION

The description of the process according to the present invention will be hereafter presented in conjunction with the attached two flowsheets presented for a better understanding of the invention.

Figure 1:
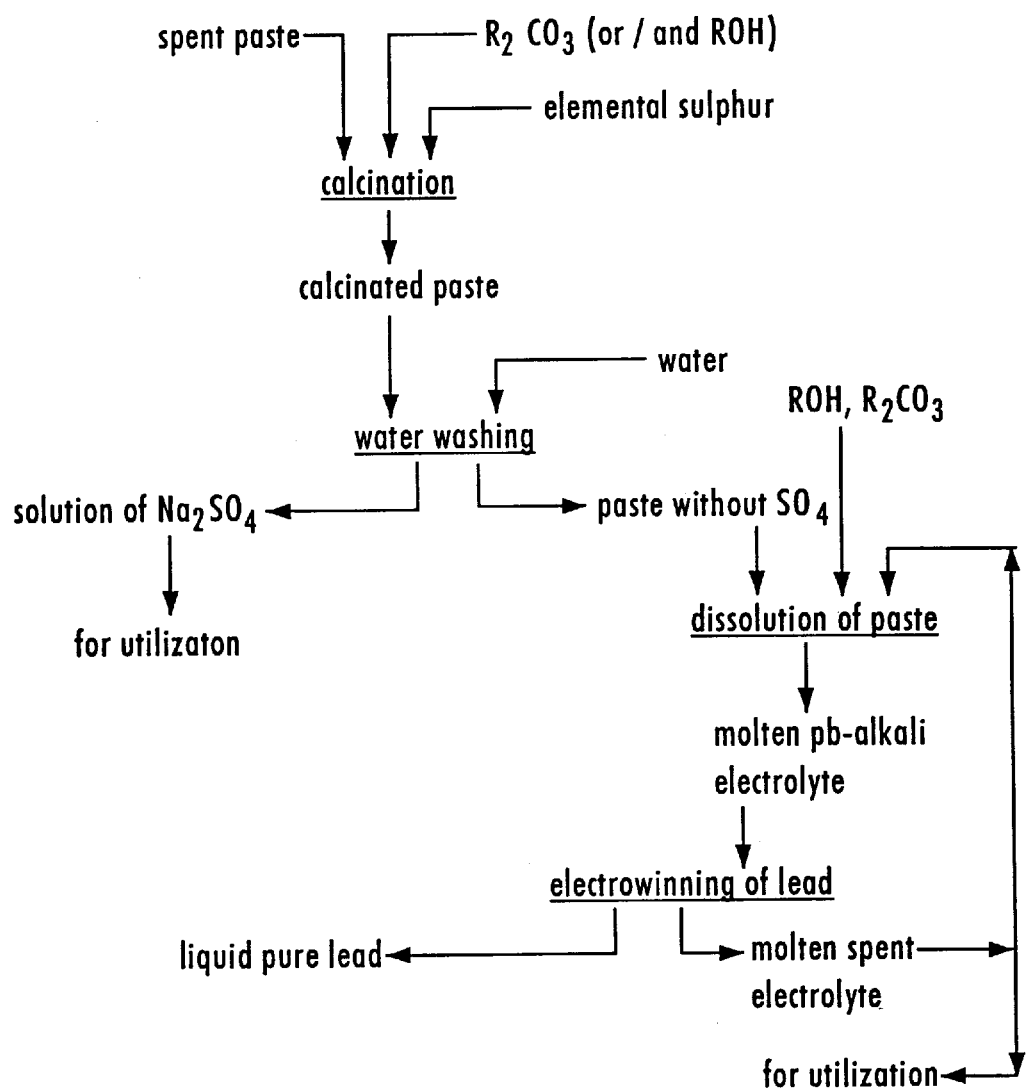
FIG. 1 is a schematic flow diagram of the production of ordinary metallic lead from spent battery paste.

The starting material is a spent battery paste as separated from exhausted batteries. As shown in FIG. 1, the flowsheet describes the production of ordinary metallic lead while in FIG. 2, the production of a high purified metallic lead is presented.

The first step, is a calcination of spent batteries with an alkali constituent, selected from sodium carbonate, sodium hydroxide and any mixture thereof containing also a small amount of sulfur, which transforms the lead constituents (lead sulfate, lead dioxide and metallic lead) into lead oxide. The sulfur incorporated, causes an autothermic treatment, by a local heating at a temperature below about 250° C. which initiates an exothermic reaction. The reaction involved is as follows:

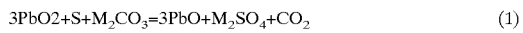

$$3PbO2+S+M_2CO_3=3PbO+M_2SO_4+CO_2 \quad (1)$$

M being selected from a metal alkali such as sodium or potassium.

At the top layer, the local initiated exothermic reaction advances down through the calcinated material, which accordingly will be rapidly heated up to between 500° C. to 600° C., without sintering the mass.

A second reaction which occurs subsequently to the above is as follows:

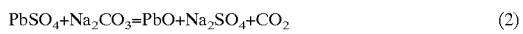

$$PbSO_4+Na_2CO_3=PbO+Na_2SO_4+CO_2 \quad (2)$$

The exothermic reactions of lead dioxide with metallic lead and carbon present in said paste, also occur but have only a secondary role in the calcination step. An excess of sulfur is not desirable, since it will cause the formation of undesirable lead sulfide.

The above two reactions provide a complete transformation of lead dioxide and lead sulfate in a very short time into lead oxide, without carbonization. This transformation occurs without undesired air blast or a toxic gas, such as sulfur dioxide, and involves only a small amount of energy. Also, the sodium sulphate which results, can be easily removed by washing with water.

Compared with the known methods of desulfurization of a spent paste, the method according to the present invention is much faster, less expensive and provides a complete desulfurization.

The calcination of a spent paste with the addition of sodium caronate was described in the U.S. Pat. No. 1,148,062, but it suffers from the large amount of energy required and the poor quality of the resulted product.

Figure 2:
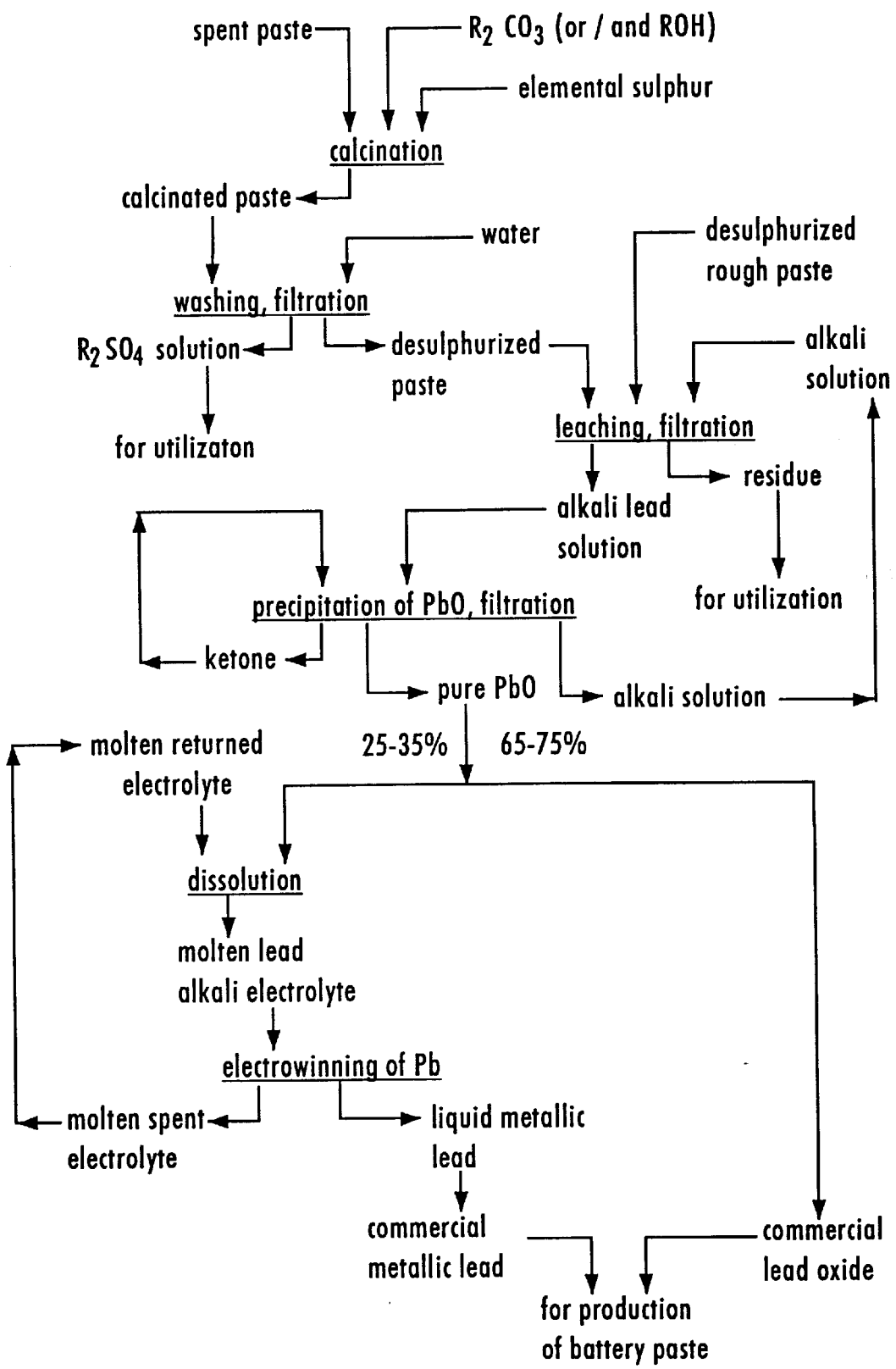
FIG. 2 is a schematic flow diagram of the production of a highly purified metallic lead from spent battery paste.

In the second step, the calcined paste can be processed by one of the following two alternatives:

(a) a direct dissolution in a molten mass as recycled from the spent electrolyte, for a subsequent electrowinning of lead (as illustrated in FIG. 1), and (b) processing into pure lead oxide, as described in U.S. patent application Ser. No. 08/579,821 filed on Feb. 7, 1996 in the name of MARGULIS (now in condition for allowance) based on Israeli Patent Application No. 116,753 followed by reducing the pure lead oxide by electrowinning, as shown in FIG. 2.

The first alternative is indeed simple, but it requires a removal of a portion of molten electrolyte which accumulates some admixtures after several cycles, thus producing a technical grade of metallic lead.

The second alternative although appears to be more complicated, has the advantage of producing a commercial metallic lead of a high purity. A modification of this alternative which might be conceived, is to admix a portion of the pure lead oxide with metallic lead in order to obtain a new paste, thus decreasing the production costs.

The dissolution of the calcined paste or the pure lead oxide in the recycled molten spent electrolyte is carried out at a temperature in the range of between 450° to 600° C. under a thorough agitation. The solubility of lead oxide in the molten spent electrolyte, increases at a higher temperature. The mass ratio of lead oxide to the electrolyte is up to 1.8, the molten lead alkali electrolyte being sent for electrowinning of lead.

The electrowinning of lead is carried out on a molten electrolyte which contains: alkali hydroxide, alkali carbonate, alkali sulfate and some dissolved lead oxide.

The composition of electrolyte (in weight percentage) is as follows:

Sodium (or potassium) hydroxide: between 65% to 100%;

Sodium (or potassium) carbonate: between 0 to 35%;

Sodium (or potassium) sulfate: between 0 to 7% (in this case the presence of lead oxide is excluded from the concentrations contents).

Whereas, the alkali hydroxides, have the role of solvents for the lead oxide, the alkali carbonates improve the electrowinning. The amount of alkali sulfates present, will determine the maximum accumulation of the soluble admixture from paste and the other constituents.

An important advantage of the present invention, is the fact that the molten electrolyte used, is less agressive than other known electrolytes based on chlorides or fluorides, possessing also a lower melting point.

The electrowinning is carried using electrodes made from a suitable metal such as stainless steel, under the following conditions:

The temperature in the range of between 450°–550° C.;

The voltage between the electrodes, between 2 to 3 V;

Current density at cathode, in the range of 1.3–5 kA/m$^2$;

Current density at anode is about 2 to 6 times more than the cathode current density;

The distance between the different electrodes, is in the range of 1 to 3 cm, and the residual concentration of lead in the tapped spent electrolyte is above 5% by weight.

The cathodic product of electrowinning accumulates at the bottom and not on the cathode, is a liquid metallic lead. Accordingly, it is possible to decrease the distance between the electrodes and thus to increase the amount of lead per volume of the cell and also a lower resistance for the current. The anodic product is substantially oxygen, which provides the stirring of the melt, and a small amount of lead dioxide which dissolves in the melt. Particular advantages of the process are the relatively lower amounts of energy involved, compared with the known method of electrowinning, being between 550 to 1,000 kwh per ton of lead and a high specific productivity in the range of between 115 to 380 kg lead per m$^2$.day.

Summing up, the process according to the present invention is characterized by the following main advantages, compared with the process from an aqueous solution:

The productivity is several times higher, at the same consumption of energy.

The process is less complicated and can be easily carried out in the removal of the lead from the cells, by tapping itself.

The process requires a molten electrolyte, at a lower melting point being less aggressive to the equipment.

The invention will be hereafter illustrated by the following Examples, being understood that these Examples are given only for a better understanding of the process without imposing any limitation to the invention as covered by the following claims.

The Examples 1 to 3, were carried out according to the flowsheet given in FIG. 1.

EXAMPLE 1

The starting material was dried battery lead spent paste, which contains (% mass):

$PbO_2$: 40.7; Pb-metal: 32.2; total $SO_4$ (in $PbSO_4$ and free $H_2SO_4$): 7.09.

An amount of 200 g of the initial paste was mixed with 27.4 g of $Na_2CO_3$ and 3.6 g of sulphur. The mixture was loaded in a stainless boat vessel and put in an electrical furnace at 250° C. The internal temperature in the heated mixture was checked by a thermocouple.

When the internal temperature in said mixture reached 110° C., the material started to heat itself rapidly and reached a maximum temperature of 513° C. during less than 1 minute. The calcination continued for about 20 minutes at this temperature.

The boat was removed from the furnace, the resulted product had a yellow colour and did not contained $PbSO_4$ or $H_2SO_4$. The sodium sulfate was removed from the calcined paste by tap water or washing solution of the sodium sulphate solution and the resulted paste was dried.

An amount of 25 g of the calcined paste was dissolved in a stirred stainless vessel, inserted in an electrofurnace at a temperature of 520° C., comprising also 200 g of a molten spent electrolyte having the following composition (wt %):

NaOH 72.0; $Na_2CO_3$ 13.9; $Na_2SO_4$ 6.5, and PbO 7.6.

Then two electrodes of stainless steel, at a distance of 2 cm one from the other, were inserted in the melt and fixed in a vertical position. A cathode having a shape of a plate and the anode having a form of comb of wires, possess the same overall sizes.

The electrowinning was performed by four subsequent operations each carried out for 25 min with interruption of electrolysis for loading of a new portion of the calcined paste portion (25 g). The electrodes were removed from the cell after each interruption and a new portion of paste was loaded in stirred melt of electrolyte and the electrodes were again inserted in the cell.

The conditions of electrowinning of lead from the molten electrolyte were as follows:

current density on a cathode Dc=2.95 $kA/m^2$, one on an anode Da=6.28$kA/m^2$, U=2.54v, t=520° C.;

initial lead concentration $C_{Pb}$=16.6%, after 4 operations the final $C_{Pb}$=11.0%; the initial and final concentration of lead increased in subsequent operation.

The summary of the results obtained were as follows:

Current efficiency 88.5%;

Specific expense of energy 742 KWh/ton Pb;

Specific productivity 242kg $Pb/m^2$.day.

The final electrolytic lead product had the following composition (weight percentage):

Pb 99.91; Sb 0.0060; Cu 0.0042; Fe 0.0058; Bi 0.0068; Zn, Sn, Cd, As, Ca each less (2–9)×0.0001.

EXAMPLE 2

This example differs from previous one by the following conditions: the duration of each one of the four electrowinning operations was 50 min, $D_c$=1.3 $kA/m^2$, $D_a$=3.06 $kV/m^2$, V=2.03V and the final lead concentration $C_{pb}$=12.6%.

The summary results were as follows:

current efficiency: 96.0%; specific energy: 545 kwh/tPb and specific productivity: 116 kg $Pb/m^2$.day.

EXAMPLE 3

The composition (% mass) of the initial electrolyte was as follows:

NaOH 69.0, PbO 31.0 (Pb 28.8%); duration of the subsequent electrowinning operation was 20 min; $D_c$=5.15 $kA/m^2$; Da=20.40 $kA/m^2$; V=3.05V, and the final lead concentration $C_{pb}$=16.1%.

The summary results were as follows:

Current efficiency 80%; specific energy 998 Kwh/tPb and specific productivity: 378 kg $Pb/m^2$.day.

EXAMPLE 4

(Carried Out According to the Flowsheet Given in FIG. 2)

Calcination of paste differs from the previous Examples by the duration of the calcination period which took only 4 minutes to reach the maximum temperature.

An amount of 200 g of calcined and desulphurized paste, with an additional portion of 3 g of rough paste added as a cementator for the removal of some metals present in the solution, was leached in an alkaline aqueous solution (50% NaOH) at a ratio of liquid to solid 5:1 at a temperature of 130° C., and then was filtered.

A purified lead alkali solution and residue resulted in this operation. The residue of about 4 g contained the following metals: antimony, ferrous, copper, barium and lead. The lead alkali solution was mixed with acetone and then a precipitate of a very pure lead oxide was obtained which contains only 0.004% extraneous cations.

An amount of 25 g of the pure lead oxide was dissolved in 200 g of molten spent electrolyte and was treated by electrowinning for 25 minutes. This operation was repeated four times.

The conditions of the electrowinning of lead from the molten electrolyte were as follows:

current density on a cathode Dx=3.2 $kA/m^2$; DA=6.1 $kA/m^2$; U=2.51v; t=520° C.; initial concentration of lead=18.7% and its final concentration 8.5% Pb.

The overal results were as follows:

current efficiency 93%;

specific expense of energy 697 kwh/t of lead, and specific productivity 276 kg $Pb/m^2$.day.

I claim:

1. A process for recovery of lead from spent battery paste and other materials, containing lead sulphate, lead dioxide and lead oxide, comprising the steps of:

(a) calcining a blend of the spent paste containing $PbSO_4$ and $PbO_2$, an alkali carbonate, and elemental sulphur, at a temperature of up to 600° C. for transforming the $PbSO_4$ and $PbO_2$ in the blend into PbO and converting the alkali carbonate and elemental sulphur into an alkali sulfate;

(b) leaching the calcinated blend with water to dissolve the alkali sulphate, and drying the leached calcinated blend to obtain a rough lead oxide; and (c) dissolving the rough lead oxide in a molten electrolyte in an electrowinning cell containing alkali hydroxide, optionally in the presence of a carbonate and a sulfate of an alkali metal, to obtain molten lead from the molten electrolyte, and tapping the molten lead from the electrowinning cell.

2. The process according to claim 1, wherein the calcination in step (a) which is carried out by heating the blend of spent paste, alkali carbonate, and elemental sulphur, includes an initiation of an exothermic reaction between the lead dioxide and the elemental sulphur, at a temperature below 250° C., the exothermic reaction raising the temperature of the blend to about 600° C. thus decreasing the need to apply external heat to achieve the temperature of about 600° C.

3. The process according to claim 1, wherein the amount of elemental sulphur added in step (a), expressed in a weight ratio $S/PbO_2$, is between 0.04 and 0.05.

4. The process according to claim 1, wherein the alkali carbonate used in steps (a) and (c), and the alkali hydroxide and sulfate used in step (c), are selected from sodium and potassium compounds, preferably from sodium compounds.

5. The process according to claim 1, wherein the amount of sodium carbonate used in step (a) with respect to the amount of lead sulphate is selected to establish a weight ratio of $Na_2CO_3/PbSO_4$ of about 0.35, and wherein the weight ratio of $Na_2CO_3/PbO_2$ is about 0.15.

6. The process according to claim 1, wherein step (c) is carried out at a constant temperature of electrolyte in the range of 450° C.–600° C.

7. The process according to claim 1, wherein step (c) is performed with molten electrolyte wherein the composition is:

NaOH (or KOH) between 65% to 100%;
$Na_2CO_3$ (or $K_2CO_3$) between 0% to 35%;
$Na_2SO_4$ (or $K_2SO_4$) between) 5 to 7%;

and wherein the weight concentration of lead in the electrolyte is above 5%.

8. The process according to claim 1, wherein a current density at a cathode of the electrowinning cell is in the range of between 1.3 to 5.0 $KA/m_2$.

9. The process according to claim 1, wherein a current density at an anode of the electrowinning cell is higher by two to six times the current density at a corresponding cathode of the electrowinning cell.

10. The process according to claim 1, wherein a voltage between electrodes of the electrowinning cell is in the range of between 2.0 to 3.0 volts.

* * * * *